(12) United States Patent
Litwinski et al.

(10) Patent No.: US 6,237,835 B1
(45) Date of Patent: May 29, 2001

(54) METHOD AND APPARATUS FOR BACKING UP A FRICTION STIR WELD JOINT

(75) Inventors: Edward Litwinski, Mission Viejo; Bert E. Syms, Orange, both of CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/515,001

(22) Filed: Feb. 29, 2000

(51) Int. Cl.⁷ .......................... B23K 20/12; B23K 37/04
(52) U.S. Cl. ............................... 228/112.1; 228/2.1
(58) Field of Search .................... 228/2.1, 112.1

(56) References Cited

U.S. PATENT DOCUMENTS

| | | | |
|---|---|---|---|
| 5,697,544 | * | 12/1997 | Wykes . |
| 5,718,366 | * | 2/1998 | Colligan . |
| 5,794,835 | * | 8/1998 | Colligan et al. . |
| 5,971,247 | * | 10/1999 | Gentry . |
| 6,050,474 | * | 4/2000 | Aota et al. . |
| 6,068,178 | * | 5/2000 | Michisaka . |
| 6,070,784 | * | 6/2000 | Holt et al. . |
| B1 6,168,066 | * | 1/2001 | Arbegast . |
| B1 6,173,880 | * | 1/2001 | Ding et al. . |

FOREIGN PATENT DOCUMENTS

| | | | |
|---|---|---|---|
| 1048390A2 | * | 11/2000 | (EP) . |
| 1057572A2 | * | 12/2000 | (EP) . |
| 11320127A | * | 11/1999 | (JP) . |
| 11320128A | * | 11/1999 | (JP) . |

* cited by examiner

Primary Examiner—Tom Dunn
Assistant Examiner—Kiley Stoner
(74) Attorney, Agent, or Firm—Alston & Bird LLP (57) ABSTRACT

The present invention provides a self-backing friction stir welding tool for backing up weld joints formed by friction stir welding large workpieces and workpieces having curvilinear geometries. The backing device includes a rotatable shoulder adapted to at least partially engage the weld joint and a probe having first and second ends and an intermediate portion therebetween. At least a portion of the intermediate portion of the probe frictionally engages the workpiece to form the weld joint. The first end of the probe defines a backing member, at least a portion of which engages the weld joint opposite the rotatable shoulder. The second end of the probe is adapted to rotatably and axial translatably communicate with the rotatable shoulder to thereby rotate the probe and urge the backing member toward the weld joint, thus constraining the plasticized material within the weld joint. The backing member can include an anchor and a support member, at least a portion of which engages the weld joint opposite the rotatable shoulder. The support member defines a recess for receiving the anchor and wherein the anchor urges the support member toward the workpiece. The support member can include at least one pair of rollers that are rotatable such that the support member is movable relative to the workpiece.

27 Claims, 7 Drawing Sheets

METHOD AND APPARATUS FOR BACKING UP A FRICTION STIR WELD JOINT

FIELD OF THE INVENTION

The present invention relates to friction stir welding and, more particularly, relates to backing up a weld joint during friction stir welding.

BACKGROUND OF THE INVENTION

Figure 1A:
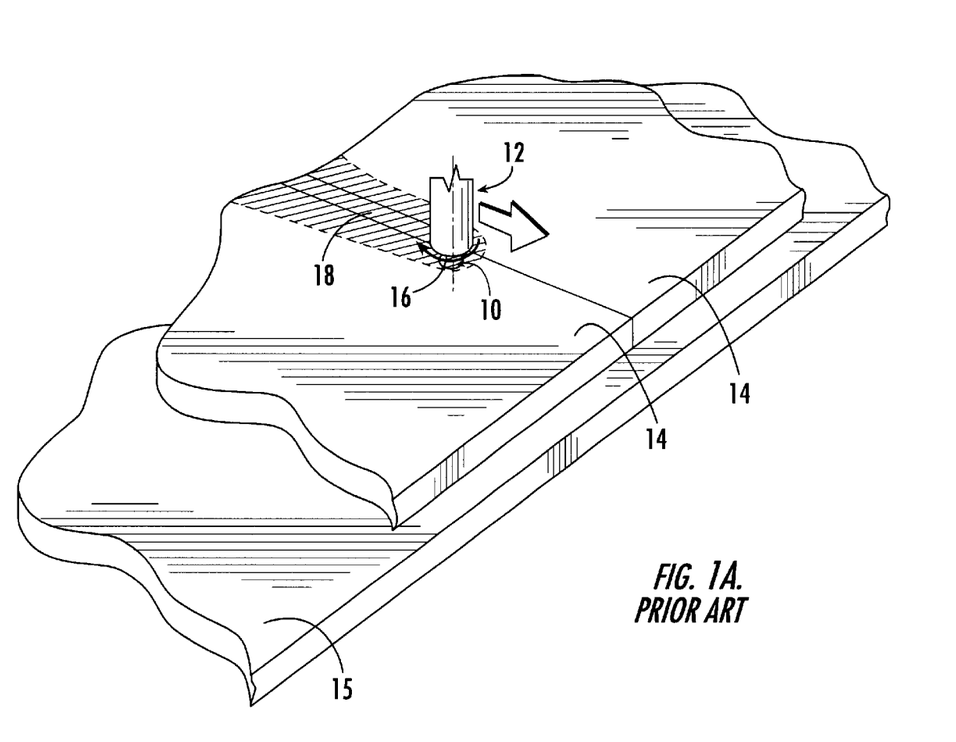
FIG. 1A is a partial perspective view of a conventional friction stir welding tool, illustrating the positioning of the shoulder and probe during friction stir welding.
Figure 1B:
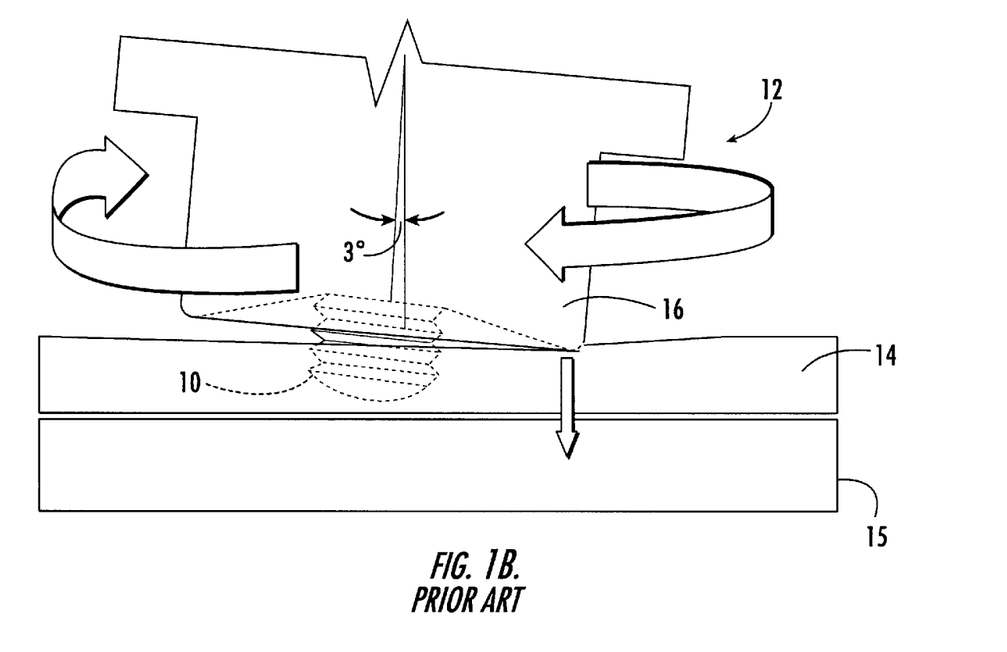
FIG. 1B is a cross-sectional view of a conventional friction stir welding tool, illustrating the positioning of the shoulder and probe during friction stir welding.

Friction stir welding is a relatively new process using a rotating tool, which includes a threaded pin or probe attached to a concave shoulder, to join in a solid state two workpieces or to repair cracks in a single workpiece. At present, the process is applied almost exclusively in straight-line welds. For example, such a process is described in U.S. Pat. No. 5,460,317 to Thomas et al., the contents of which are incorporated herein by reference. As shown in FIG. 1A, during friction stir welding, the probe 10 of the rotating tool 12 is plunged into a workpiece or between two workpieces 14 by a friction stir welding machine (not shown) to produce the required resistance force to generate sufficient frictional heating to form a region of plasticized material. As shown in FIG. 1B, the tool 12 is typically tilted approximately 3° relative to the workpiece or workpieces 14 such that the trailing edge of the concave shoulder 16 is thrust into and consolidates the plasticized material. Upon solidification of the plasticized material, the workpieces 14 are joined along the weld joint 18. The magnitude of force exerted by the friction stir welding tool 12 must be maintained above a prescribed minimum in order to generate the required frictional heating.

To prevent deformation of a workpiece by the force exerted by the friction stir welding tool 12 and maintain dimensional tolerances, the workpiece 14 must have support 15 behind the weld joint. Additionally, because the frictional heat generated by the welding tool plasticizes the material within the weld joint, the plasticized material must be constrained to prevent the material from flowing out of the weld joint and also must be consolidated to minimize porosity and provide a weld joint having the desired surface finish. When friction stir welding relatively flat workpieces, the weld joint can be supported by a continuous planar surface, such as a steel plate, positioned underneath the workpieces to be joined.

When friction stir welding large workpieces or workpieces having curvilinear geometries, providing adequate support to the weld joint becomes problematic because the amount of support material necessary and/or the curvilinear geometry makes it more difficult and expensive to provide a continuous support surface. Such welds are often necessary when fabricating military and commercial aircraft and rocket fuel tanks. In certain instances, a built-up structure, commonly referred to as "tooling," can be secured to the interior surfaces of the workpieces prior to friction stir welding. However, weight restrictions and/or design parameters often require a finished assembly having a smooth interior surface. As such, the tooling must be removed, for example, by machining, which is time consuming and labor intensive and increases the manufacturing cost of the finished assembly.

Thus, there is a need for an improved backing device for weld joints formed by friction stir welding large workpieces or workpieces having curvilinear geometries. The backing device should be capable of effectively supporting a weld joint and constraining the plasticized material within the weld joint during friction stir welding. Additionally, the backing device should be easily adaptable to varying workpiece geometries and sizes.

SUMMARY OF THE INVENTION

The present invention provides an apparatus and an associated method for backing up weld joints formed by friction stir welding. The self-backing friction stir welding tool includes a rotatable shoulder adapted to at least partially engage the weld joint. The backing device also includes a probe having first and second ends and an intermediate portion therebetween. At least a portion of the intermediate portion of the probe is capable of frictionally engaging the workpiece to form the weld joint. The first end of the probe defines a backing member, at least a portion of which engages the weld joint opposite the rotatable shoulder. Advantageously, the second end of the probe is adapted to rotatably and axial translatably communicate with the rotatable shoulder to thereby rotate the probe and urge the backing member toward the weld joint, thus constraining the plasticized material within the weld joint. According to one embodiment, the shoulder defines a threaded aperture and the probe defines a plurality of threads that are in rotatable and axial translatable communication with the threaded aperture of the shoulder to thereby rotate the probe and urge the backing member toward the weld joint. The backing member can be contoured to correspond to the contour of the workpiece.

The backing member can include an anchor, such as a ball joint, and a support member, at least a portion of which engages the weld joint opposite the rotatable shoulder. Advantageously, the support member defines a recess for receiving the anchor and wherein the anchor urges the support member toward the workpiece and maintains the support member in this position. In one embodiment, the recess of the backing member includes a plurality of thrust bearings to rotatably receive the anchor. The support member can include at least one pair of rollers that are rotatable such that the support member is movable relative to the workpiece.

The backing device can also include a carriage that defines an aperture therethrough for rotatably mounting the rotatable shoulder at an angle relative to the workpiece. The carriage can include at least one pair of rollers that are rotatably secured to the carriage such that the carriage is movable relative to the workpiece.

The present invention also provides an apparatus for friction stir welding a weld joint in a workpiece. According to one embodiment, the friction stir welding device includes a milling machine having a spindle in rotatable communication with a shoulder adapted to at least partially engage the weld joint formed in the workpiece to consolidate the plasticized material within the weld joint. The friction stir welding device also includes a probe having first and second ends and an intermediate portion therebetween. At least a portion of the intermediate portion of the probe is capable of frictionally engaging the workpiece to form the weld joint. The first end of the probe defines a backing member, at least a portion of which engages the weld joint opposite the shoulder. Advantageously, the second end of the probe is adapted to rotatably and axial translatably communicate with the rotatable shoulder to thereby rotate the probe and urge the backing member toward the weld joint. According to one embodiment, the shoulder defines a threaded aperture and the probe defines a plurality of threads that are in rotatable and axial translatable communication with the threaded aperture of the shoulder to thereby rotate the probe and urge the backing member toward the weld joint. The backing member can be contoured to correspond to the contour of the workpiece.

The backing member can include an anchor, such as a ball joint, and a support member, at least a portion of which engages the weld joint opposite the rotatable shoulder. Advantageously, the support member defines a recess for receiving the anchor and wherein the anchor urges the support member toward the workpiece and maintains the support member in this position. In one embodiment, the recess of the backing member includes a plurality of thrust bearings to rotatably receive the anchor. The support member can include at least one pair of rollers that are rotatable such that the support member is movable relative to the workpiece.

The friction stir welding device can also include a carriage that defines an aperture therethrough for rotatably mounting the rotatable shoulder at an angle relative to the workpiece. The carriage can include at least one pair of rollers that are rotatable such that the carriage is movable relative to the workpiece.

The present invention also provides a method of friction stir welding a workpiece, comprising the steps of positioning a shoulder adjacent a first side of the workpiece. A friction stir welding probe having first and second ends and an intermediate portion is positioned adjacent a second side of the workpiece opposite the shoulder and wherein the first end of the friction stir welding probe defines a backing member and the second end of the friction stir welding probe is adapted to rotatably and axial translatably communicate with the shoulder. The second end of the friction stir welding probe is then secured to the shoulder. According to one embodiment. the securing step includes threading the second end of the probe into a threaded aperture defined by the shoulder. After the securing step, the shoulder is rotated such that the intermediate portion of the friction stir welding probe frictionally engages the workpiece and the backing member is urged toward the workpiece. The intermediate portion of the friction stir welding probe is moved through the workpiece. According to one embodiment, an aperture is pre-drilled in the workpiece prior to the securing step to receive the friction stir welding probe. The second end of the friction stir welding probe is then inserted through the aperture. According to another embodiment, the workpiece is pre-drilled prior to the inserting step for the initial starting position of the backing member. According to still another embodiment, the workpiece is pre-drilled prior to the inserting step for the initial starting position of the shoulder.

Accordingly, there has been provided an apparatus and associated method allowing for the formation of uniform weld joints in large workpieces or workpieces having curvilinear geometries. In particular, the backing device is capable of effectively supporting a weld joint to thereby maintain the manufacturing tolerances of the workpiece, as well as to constrain the plasticized material within the weld joint without the necessity of constructing expensive support tooling.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, and wherein.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2A:
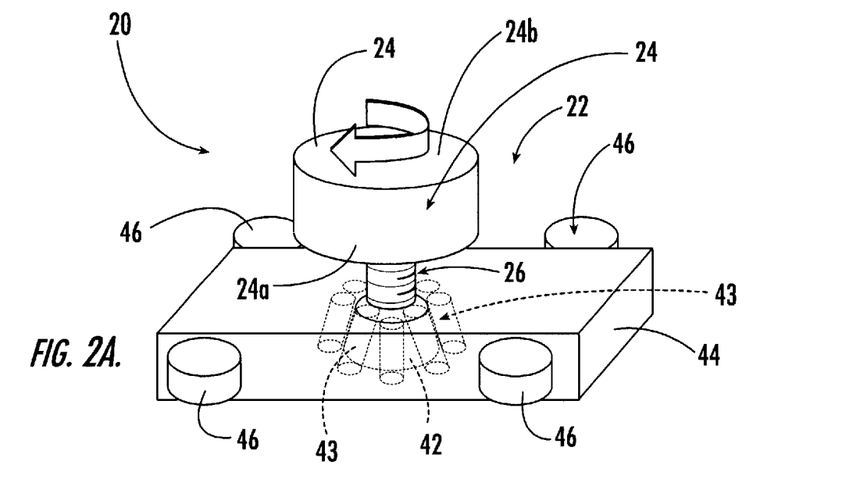
FIG. 2A is a perspective view illustrating a self-backing friction stir welding tool, according to one embodiment of the present invention.

Referring now to the drawings and, in particular, to FIG. 2A, there is shown a friction stir welding device 20, according to one embodiment of the present invention, for friction stir welding a workpiece or workpieces. The friction stir welding device 20 of the present invention is particularly suited for friction stir welding large workpieces and workpieces having curvilinear geometries. The friction stir welding device 20 includes a milling machine (not shown) having a spindle (not shown) in rotatable communication with a self-backing friction stir welding tool 22.

Figure 2B:
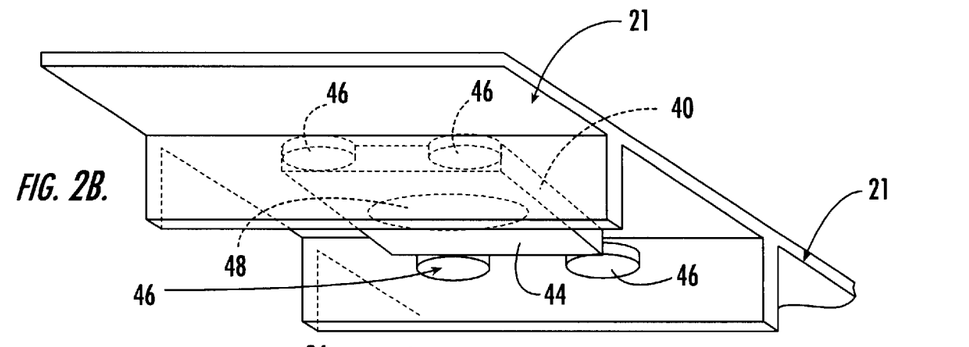
FIG. 2B is a perspective view illustrating the backing member of the self-backing friction stir welding tool of FIG. 2A.
Figure 2C:
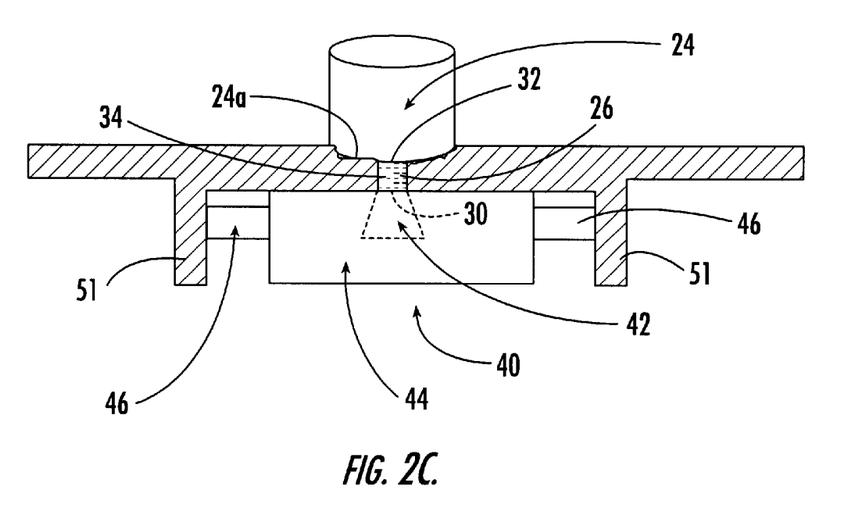
FIG. 2C is a perspective view illustrating the self-backing friction stir welding tool of FIG. 2A during friction stir welding.
Figure 2D:
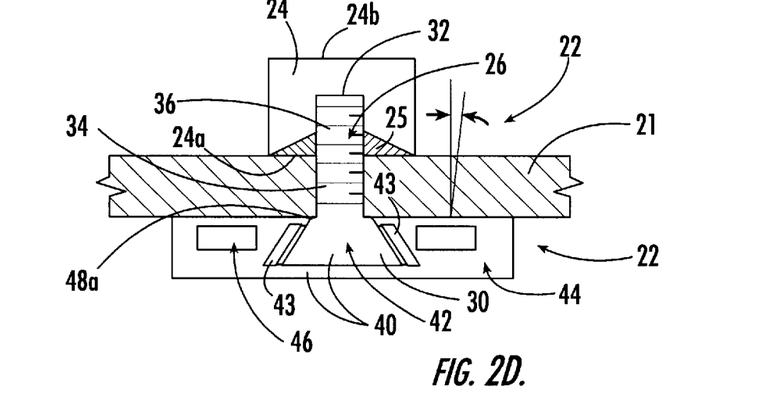
FIG. 2D is a partial cross-sectional view of the self-backing friction stir welding tool of FIG. 2C taken along lines 2D—2D.
Figure 3:
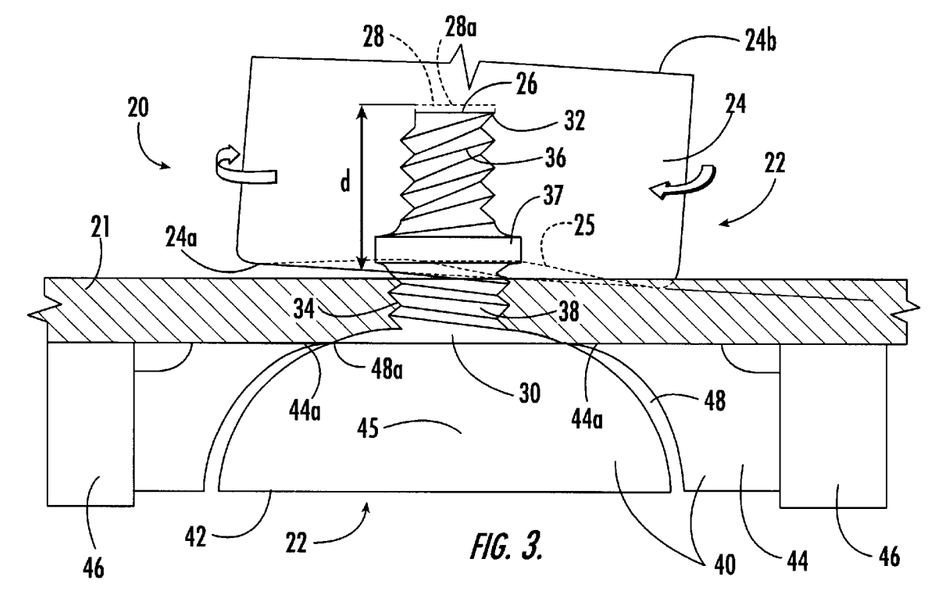
FIG. 3 is a cross-sectional view of a self-backing friction stir welding tool, according to another embodiment of the present invention, illustrating the positioning of the shoulder, probe, and backing member during friction stir welding.

The self-backing friction stir welding tool 22 includes a shoulder 24 and a probe 26. As illustrated in FIGS. 2D and 3, the first end 24a of the shoulder 24, which is adjacent the workpiece 21, can be concaved 25 to capture and consolidate the plasticized material in the weld joint. The shoulder 24 preferably defines an aperture 28 at the end 24a of the shoulder adjacent the workpiece 21, which can be threaded. The second end 24b of the shoulder 24 is adapted to engage the spindle (not shown) of the milling machine (not shown), as is known in the art.

As illustrated in FIG. 2D and 3, the probe 26 has first and second ends 30, 32 and an intermediate portion 34. The probe 26 is preferably formed of a material having high strength and heat resistance, including tool steel, a molybdenum alloy, such as TZM, and nickel alloys, such as Rene 41 (UNS N07041). The first end 30 of the probe 26 defines a backing member 40 at least a portion of which engages the weld joint to constrain the plasticized material within the weld joint. In one embodiment, as illustrated in FIGS. 2D and 3, the backing member 40 includes an anchor or base 42 and a support member 44. As illustrated in FIG. 2B, the support member 44 defines a recess 48 for rotatably receiving the anchor 42. The recess 48 of the support member 44 further defines an aperture 48a through which the intermediate portion 34 of the probe 26 at least partially extends. In one embodiment, as illustrated in FIGS. 2A and 2D, the anchor 42 has a conic configuration and is rotatably received within the recess 48 of the support member 44 through a series of thrust bearings 43. In another embodiment, as illustrated in FIG. 3, the anchor 42 comprises a ball joint 45, which can be rotatably received within the recess 48 of the support member 44 through a series of thrust bearings (not shown), although, depending on the loads generated during friction stir welding, such bearings may not be required provided the ball joint is adequately lubricated. The diameter of the anchor 42 is approximately equal to, and preferably less than, the diameter of the shoulder 24. The support member 44 preferably includes at least one pair of rollers 46, such as roller bearings, wheels or cam rollers, which are rotatably secured to opposite ends of the support member such that the support member is movable relative to the workpiece 21 as the probe 26 is moved through the workpiece to form the weld joint.

As discussed more fully below, the backing member 40 and, more specifically, the anchor 42, is urged toward the weld joint during friction stir welding such that the workpieces 21 are "sandwiched" between the backing member and the shoulder 24. Advantageously, the force exerted by the anchor 42 against the support member 44 and, in particular, the inner edges 44a of the aperture 48a defined by the recess 48 of the support member, compresses the inner edges between the workpiece and the anchor creating a seal that prevents the plasticized material from being extruded into the recess of the support member. In an alternate embodiment, the support member 44 can include a separate seal member (not shown) around the aperture 48a defined by the recess 48 of the support member 44.

The second end 32 of the probe 26 is preferably adapted to rotatably and axial translatably engage the first end 24a of the shoulder 24 such that the probe rotates with the shoulder and the backing member 40 defined by the first end 30 of the probe is urged toward the weld joint. In one embodiment, as illustrated in FIGS. 2D and 3, the second end 32 of the probe 26 defines one or more threads 36 that engage the threaded aperture 28 of the shoulder 24. Preferably, the threaded aperture 28 of the shoulder 24 defines a stop 28a for the second end 32 of the probe to prevent further rotation or axial translation of the probe relative to the shoulder. Thus, when the second end 32 of the probe 26 is threaded into the threaded aperture 28 and positioned adjacent the stop 28a, the probe and shoulder rotate in unison.

As the second end 32 of the probe 26 is threaded into the threaded aperture 28 of the shoulder 24, the backing member 40 defined by the first end 30 of the probe is drawn toward the workpiece 21. Preferably, the depth d of the threaded aperture 28 is greater than the length of the second end 32 and the intermediate portion 34 of the probe 26 less the thickness of the workpiece 21 such that, when the second end 32 of the probe is positioned adjacent the stop 28a, the backing member 40 will be at least partially positioned against the workpiece 21 opposite the shoulder 24 and will exert sufficient force against the workpiece 21 to effectively support the weld joint and constrain the plasticized material within the weld joint. In the embodiments illustrated in FIGS. 2A and 3, the anchor 42 portion of the backing member 40 and, in particular, the conic configured anchor or the ball joint 45, respectively, is forced into the recess 48 defined in the support member 44 thereby forcing the support member against the workpiece 21 and the weld joint. Advantageously, the depth d of the threaded aperture 28 is proportional to the force exerted by the backing member 40 against the workpiece 21 and the weld joint such that, the greater the depth d of the threaded aperture, the greater the force exerted by the backing member.

In another embodiment (not shown), the self-backing friction stir weld device 20 includes means for rotating and automatically axially translating the second end 32 of the probe 26 relative to the first end 24a of the shoulder 24 in response to changes in the magnitude of the force exerted by the backing member 40 on the workpiece and the weld joint. The friction stir weld device 20 includes means for measuring the magnitude of the force exerted by the backing member upon the workpieces and the weld joint. The means for measuring the magnitude of the force can include a computing means, such as a computer, a microprocessor a microcontroller or the like, in electrical communication with a sensor, such as a strain-gage load cell a piezoelectric load cell, a dynamometer, a pneumatic load cell, or a hydraulic load cell. The friction stir weld device 20 also includes means responsive to the measuring means, for axially translating the second end 32 of the probe 26 relative to the first end 24a of the shoulder 24 so as to axially translate the backing member 40 toward or away from the workpiece in order to modify the force exerted by the backing member upon the workpiece and weld joint. The means responsive to the measuring means can include cams and a follower, a power screw, or an actuator assembly, such as one or more pneumatic or hydraulic arms. For example, the assignee of the present application has developed methods and apparatus for controlling the position of the probe, as disclosed in commonly owned U.S. patent application Ser. No. 09/087, 416 entitled "Method and Apparatus for Controlling Downforce During Friction Stir Welding" filed on May 29, 1998, the entire disclosure of which is hereby incorporated by reference.

As the shoulder 24 rotates during friction stir welding, the second end 32 of the probe 26 is rotated so that the intermediate portion 34 of the probe frictionally engages the workpiece 21 to thereby form a weld joint. The intermediate portion 34 of the probe 26 preferably defines one or more threads 38 to facilitate mixing of the plasticized material in the weld joint. The second end 32 of the probe 26 can be threaded in one direction and the intermediate portion 34 of the probe threaded in a different direction or in the same direction. In one embodiment, as illustrated in FIG. 3, the threads 38 of the intermediate portion 34 of the probe 26 are threaded in a direction opposite to the direction of the threads 36 of the second end 32 of the probe such that rotation of the shoulder in the clockwise direction results in the threads 38 of the intermediate portion mixing the plasticized material towards and into the concave 25 first end 24a of the shoulder 24. The probe 26 can include a land or unthreaded portion 37 separating the threads 38 of the intermediate portion 34 and the threads 36 of the second end 32 of the probe, which is particularly beneficial when forming threads 36, 38 having different directions. The diameter of the unthreaded portion 37 is preferably larger than the diameter of the probe and is positioned on the probe such that the unthreaded portion is adjacent the opening of the threaded aperture 28 of the shoulder 24 when the second end 32 of the probe is adjacent the stop 28a, thus, forming a seal to prevent the plasticized material from extruding into the threaded aperture.

In operation, the second end 32 of the probe 26 can be at least partially threaded into the aperture 28 of the shoulder 24 at the edge of the workpiece 21 such that the edge of the workpiece is positioned between the shoulder and the backing member 40. In this position, the intermediate portion 34 of the probe 26 is adjacent the edge of the workpiece 21. The friction stir welding process is started by rotating the shoulder 24 and moving the intermediate portion 34 of the probe 26 into and through the edge of the workpiece 21 into frictional engagement with the workpiece 21. The rotation of the shoulder 24 will draw the threads 36 of the second end 32 of the probe 26 toward the threaded aperture 28 of the shoulder until the second end 32 of the probe is adjacent the stop 28a, at which point the probe and the shoulder will rotate in unison and the backing member 40 will be at least partially positioned against the workpiece 21 opposite the shoulder 24 and will exert sufficient force against the workpiece 21 to effectively support the weld joint and constrain the plasticized material within the weld joint. As such, the workpiece 21 is "sandwiched" between the shoulder 24 and the backing member 40. As the intermediate portion 34 of the probe 26 is moved through the workpiece 21 to form the friction stir weld joint, the backing member 40 will remain in contact with the workpiece opposite the shoulder 24 to support the workpiece and constrain the plasticized material in the weld joint.

Figure 5:
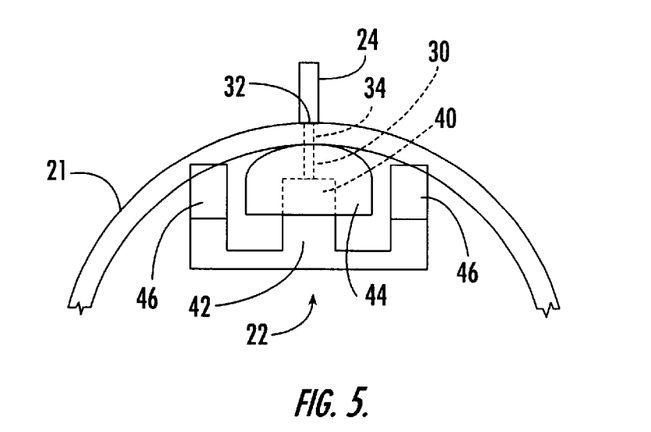
FIG. 5 is a cross-sectional view of a self-backing friction stir welding tool, according to another embodiment of the present invention, illustrating the positioning of the shoulder, probe, and backing member during friction stir welding.
Figure 6:
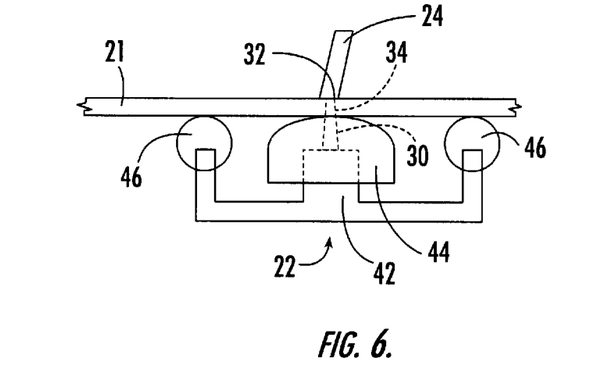
FIG. 6 is a cross-sectional view of a self-backing friction stir welding tool, according to still another embodiment of the present invention, illustrating the positioning of the shoulder and backing member during friction stir welding.

As illustrated in FIGS. 5 and 6, the self-backing friction stir weld tool 22 may be used to friction stir weld workpieces 21 having both flat and curvilinear configurations. Advantageously, as illustrated in FIGS. 5 and 6, the backing member 40 can be contoured to correspond to the contour of the workpiece to be friction stir welded. In addition, as illustrated in FIG. 2C, rails or stringers 51 may be attached to, or formed integrally with, the side of the workpiece adjacent the backing member 40 to provide a contact surface for the rollers 46 of the support member 44.

Figure 4:
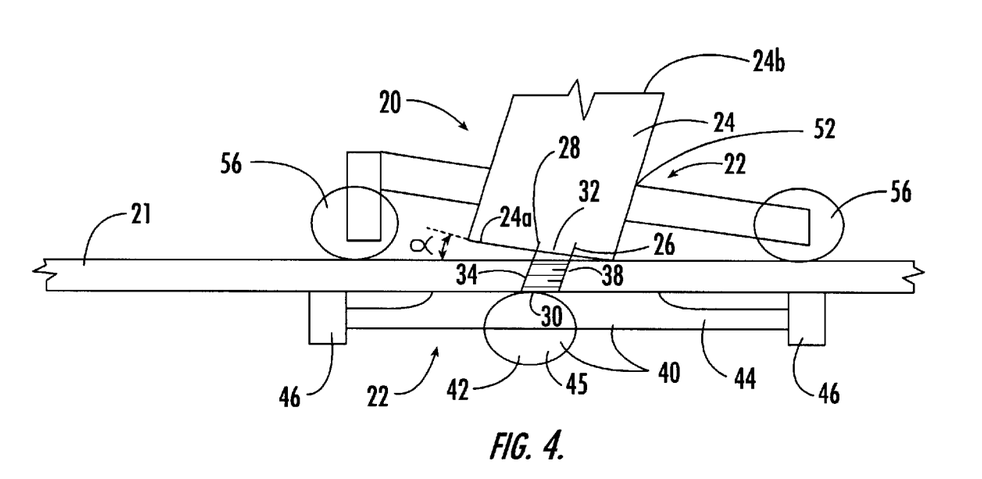
FIG. 4 is a cross-sectional view of a self-backing friction stir welding tool, according to another embodiment of the present invention, illustrating the positioning of the shoulder, probe, and backing member during friction stir welding.

As illustrated in FIG. 4, for a portable friction stir welding device the device may include a carriage 50, which can be mounted to the milling machine (not shown), to maintain the shoulder 24 at the desired "angle of attack" a. The carriage 50 preferably defines an aperture 52 therethrough for rotatably mounting the shoulder 24 at an angle relative to the workpiece 21. The carriage can also include at least one pair of rollers 56, such as roller bearings or wheels, which are rotatably secured to the carriage such that the carriage is movable relative to the workpiece as the probe 26 is moved through the workpiece to form the weld joint.

Figure 7:
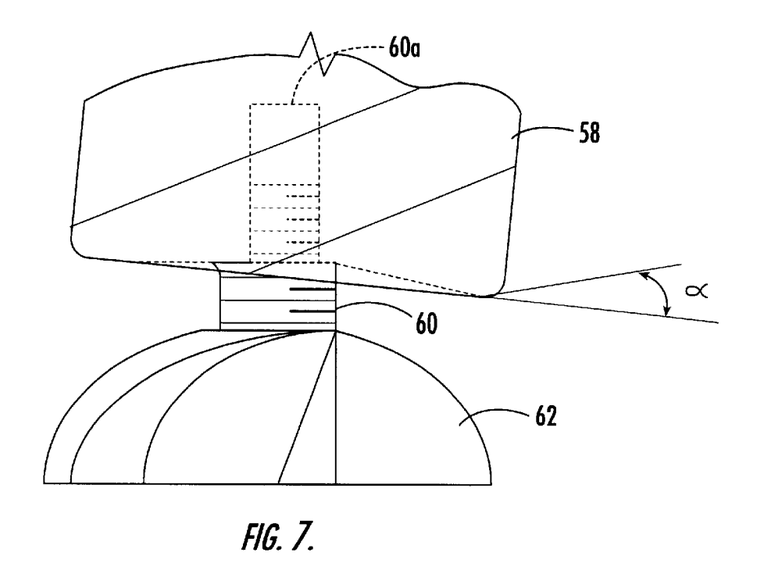
FIG. 7 is a cross-sectional view illustrating a custom drill bit for pre-drilling the workpiece prior to commencing friction stir welding.

Referring to FIG. 7, there is illustrated a custom drill bit 54 for preparing a workpiece for friction stir welding using the self-backing friction stir welding tool 22. The custom drill bit 54 includes a shoulder cutter 58, a pin or probe cutter 60, and a backing member cutter 62. First, the probe and backing member cutters 60, 62, which can be formed integrally or as separate cutters that are threadably attached, are used to pre-drill the initial starting position of the backing member 40 and intermediate portion 34 of the probe 26. Thereafter, the shoulder cutter 58 is threadably attached to the end 60a of the probe cutter 60 and the initial position of the shoulder 24 is pre-drilled, which includes the desired angle of attack a. Pre-drilling the initial starting positions of the shoulder 24, intermediate portion 34 of the probe 26 and backing member 40 reduces the amount of torque necessary to initiate the friction stir welding process.

For applications where the workpiece 21 is pre-drilled for the shoulder 24, probe 26, and backing member 40, the shoulder and probe are assembled by inserting the second end 32 of the probe into the aperture pre-drilled through the workpiece. The second end 32 of the probe 26 is at least partially threaded into the threaded aperture 28 of the shoulder 24 such that the workpiece 21 is positioned between the shoulder and the backing member 40. The backing member 40 and shoulder 24 are then positioned within the respective pre-drilled areas. A donut of filler material (not shown) may be inserted within the concave 25 first end 24a of the shoulder 24 to fill the shoulder's weld metal reservoir. Thereafter, the shoulder 24 is rotated to bring the intermediate portion 34 of the probe 26 into frictional engagement with the workpiece 21 to form a weld joint. As discussed above, the rotation of the shoulder 24 will draw the threads 36 of the second end 32 of the probe 26 toward the threaded aperture 28 of the shoulder until the second end 32 of the probe is adjacent the stop 28a, at which point the probe and the shoulder will rotate in unison and the backing member 40 will be at least partially positioned against the workpiece 21 opposite the shoulder 24 and will exert sufficient force against the workpiece 21 to effectively support the weld joint and constrain the plasticized material within the weld joint. As such, the workpiece 21 is "sandwiched" between the shoulder 24 and the backing member 40. As the intermediate portion 34 of the probe 26 is moved through the workpiece 21 to form the friction stir weld joint, the backing member 40 will remain in contact with the workpiece opposite the shoulder 24 to support the workpiece and constrain the plasticized material in the weld joint.

Figure 8:
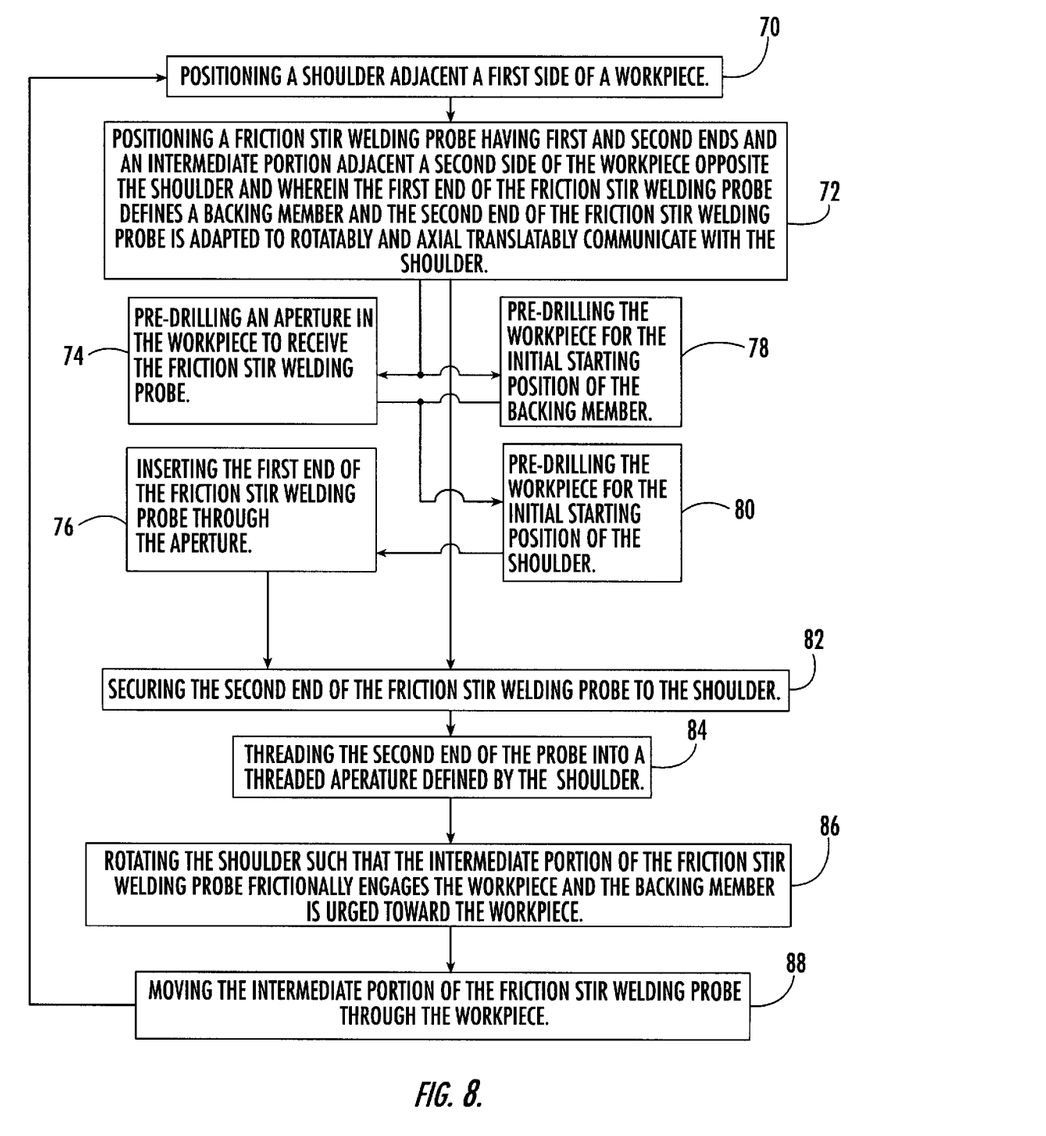
FIG. 8 is a flow chart illustrating the steps for friction stir welding, according to one embodiment of the present invention.

As illustrated in FIG. 8, the present invention also provides a method of friction stir welding a workpiece, comprising the steps of positioning a shoulder adjacent a first side of the workpiece. See block 70. A friction stir welding probe having first and second ends and an intermediate portion is positioned adjacent a second side of the workpiece opposite the shoulder, wherein the first end of the friction stir welding probe defines a backing member and the second end of the friction stir welding probe is adapted to rotatably and axial translatably communicate with the shoulder. See block 72. The second end of the friction stir welding probe is then secured to the shoulder. See block 82. According to one embodiment, the securing step includes threading the second end of the probe into a threaded aperture defined by the shoulder. See block 84. After the securing step, the shoulder is rotated such that the intermediate portion of the friction stir welding probe frictionally engages the workpiece and the backing member is urged toward the workpiece. See block 86. The intermediate portion of the friction stir welding probe is moved through the workpiece. See block 88.

The friction stir welding process can be performed without pre-drilling for the shoulder 24, probe 26, and backing member 40 by assembling the self-backing friction stir welding tool and positioning the tool adjacent the edge of the workpiece. The shoulder can then be rotated and the intermediate portion of the probe, which will frictionally engage the workpiece edge, moved into the workpiece. According to another embodiment, an aperture is pre-drilled in the workpiece prior to the securing step to receive the friction stir welding probe. See block 74. The second end of the friction stir welding probe is then inserted through the aperture. See block 76. According to another embodiment, the workpiece is pre-drilled prior to the inserting step for the initial starting position of the backing member. See block 78. According to still another embodiment, the workpiece is pre-drilled prior to the inserting step for the initial starting position of the shoulder. See block 80.

Thus, there has been provided an apparatus and associated method allowing for the formation of uniform weld joints in workpieces having curvilinear geometries. In particular, the backing device is capable of effectively supporting a weld joint to thereby maintain the manufacturing tolerances of the workpiece, as well as to constrain the plasticized material within the weld joint. Additionally, the backing device can be configured to easily adapt to varying workpiece geometries.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for backing up a weld joint formed in a workpiece by friction stir welding, comprising:
   a rotatable shoulder, said shoulder adapted to at least partially engage the weld joint; and
   a probe having first and second ends and an intermediate portion therebetween, at least a portion of said intermediate portion of said probe capable of frictionally engaging the workpiece to form the weld joint, said first end of said probe defining a backing member, at least a portion of said backing member engaging the weld joint opposite the shoulder, wherein said second end of said probe is adapted to rotatably and axial translatably communicate with said rotatable shoulder to thereby rotate said probe and urge said backing member toward the weld joint.

2. An apparatus according to claim 1 wherein said backing member is contoured to correspond to the contour of the workpiece.

3. An apparatus according to claim 1 further comprising:
   a carriage, said carriage defining an aperture therethrough for rotatably mounting said rotatable shoulder at an angle relative to said workpiece; and
   at least one pair of rollers, said at least one pair of rollers being rotatably secured to said carriage such that said carriage is movable relative to the workpiece.

4. An apparatus according to claim 1 wherein said backing member comprises:
   an anchor; and
   a support member, at least a portion of said support member engaging the weld joint opposite said rotatable shoulder, said support member defining a recess for rotatably receiving said anchor whereby said anchor urges said support member toward the workpiece.

5. An apparatus according to claim 4 wherein said support member comprises at least one pair of rollers, said at least one pair of rollers are rotatable such that said support member is movable relative to the workpiece.

6. An apparatus according to claim 4 wherein said anchor is comprised of a ball joint.

7. An apparatus according to claim 4 wherein said recess of said backing member comprises a plurality of thrust bearings to rotatably receive said anchor.

8. An apparatus for backing up a weld joint formed in a workpiece by friction stir welding, comprising:
   a rotatable shoulder, said shoulder adapted to at least partially engage the weld joint, said shoulder defining a threaded aperture; and
   a probe having first and second ends and an intermediate portion therebetween, at least a portion of said intermediate portion of said probe capable of frictionally engaging the workpiece to form the weld joint, said first end of said probe defining a backing member, at least a portion of said backing member engaging the weld joint opposite the shoulder, said second end of said probe defining a plurality of threads, said plurality of threads in rotatable and axial translatable communication with said threaded aperture of said rotatable shoulder to thereby rotate said probe and urge said backing member toward the weld joint.

9. An apparatus according to claim 8 wherein said backing member is contoured to correspond to the contour of the workpiece.

10. An apparatus according to claim 8 wherein said support member comprises at least one pair of rollers, said at least one pair of rollers are rotatable such that said support member is movable relative to the workpiece.

11. An apparatus according to claim 8 further comprising:
    a carriage, said carriage defining an aperture therethrough for rotatably mounting said rotatable shoulder at an angle relative to said workpiece; and
    at least one pair of rollers, said at least one pair of rollers being rotatably secured to said carriage such that said carriage is movable relative to the workpiece.

12. An apparatus according to claim 8 wherein said backing member comprises:
    an anchor; and
    a support member, at least a portion of said support member engaging the weld joint opposite said rotatable shoulder, said support member defining a recess for rotatably receiving said anchor whereby said anchor urges said support member toward the workpiece.

13. An apparatus according to claim 12 wherein said anchor is comprised of a ball joint.

14. An apparatus according to claim 12 wherein said recess of said backing member comprises a plurality of thrust bearings to rotatably receive said anchor.

15. An apparatus for friction stir welding a weld joint in a workpiece, comprising:
    a milling machine having a rotatable spindle;
    a shoulder in rotatable communication with said spindle, said shoulder adapted to at least partially engage the weld joint; and
    a probe having first and second ends and an intermediate portion therebetween, at least a portion of said intermediate portion of said probe capable of frictionally engaging the workpiece to form the weld joint, said first end of said probe defining a backing member, at least a portion of said backing member engaging the weld joint opposite the shoulder, and wherein said second end of said probe is adapted to rotatably and axial translatably communicate with said shoulder to thereby rotate said probe and urge said backing member toward the weld joint.

16. An apparatus according to claim 15 wherein said second end of said probe defines a plurality of threads in rotatable and axial translatable communication with said shoulder.

17. An apparatus according to claim 15 wherein said backing member is contoured to correspond to the contour of the workpiece.

18. An apparatus according to claim 15 wherein said backing member comprises:
   an anchor; and
   a support member, at least a portion of said support member engaging the weld joint opposite said rotatable shoulder, said support member defining a recess for receiving said anchor whereby said anchor urges said support member toward the workpiece.

19. An apparatus according to claim 18 wherein said support member comprises at least one pair of rollers, said at least one pair of rollers are rotatable such that said support member is movable relative to the workpiece.

20. An apparatus according to claim 18 wherein said anchor is comprised of a ball joint.

21. An apparatus according to claim 18 wherein said recess of said backing member comprises a plurality of thrust bearings to rotatably receive said anchor.

22. A method of friction stir welding a workpiece, comprising the steps of:
   positioning a shoulder adjacent a first side of the workpiece;
   positioning a friction stir welding probe adjacent a second side of the workpiece opposite the shoulder, the friction stir welding probe having first and second ends and an intermediate portion, the first end of the friction stir welding probe defining a backing member, the second end of the friction stir welding probe adapted to rotatably and axial translatably communicate with the shoulder;
   securing the second end of the friction stir welding probe to the shoulder; and
   thereafter, rotating the shoulder such that the intermediate portion of the friction stir welding probe is in frictional engagement with the workpiece and the backing member is urged toward the workpiece.

23. A method of friction stir welding a workpiece according to claim 22, wherein said securing step comprises threading the second end of the probe into a threaded aperture defined by the shoulder.

24. A method of friction stir welding a workpiece according to claim 22, further comprising the step of moving the intermediate portion of the friction stir welding probe through the workpiece.

25. A method of friction stir welding a workpiece according to claim 22, further comprising the steps of:
   prior to said securing step, pre-drilling an aperture in the workpiece to receive the friction stir welding probe prior to said securing step; and
   inserting the second end of the friction stir welding probe through the aperture.

26. A method of friction stir welding a workpiece according to claim 25, further comprising the step of pre-drilling the initial position of the backing member prior to said inserting step.

27. A method of friction stir welding a workpiece according to claim 26, further comprising the step of pre-drilling the initial position of the shoulder prior to said inserting step.

* * * * *